United States Patent
Boeck

(10) Patent No.: US 11,280,200 B2
(45) Date of Patent: Mar. 22, 2022

(54) GAS TURBINE BLADE

(71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 171 days.

(21) Appl. No.: 16/459,675

(22) Filed: Jul. 2, 2019

(65) Prior Publication Data
US 2020/0011184 A1 Jan. 9, 2020

(30) Foreign Application Priority Data
Jul. 6, 2018 (DE) ...................... 10 2018 211 193.6

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2220/323* (2013.01); *F05D 2230/60* (2013.01); *F05D 2300/20* (2013.01); *F05D 2300/601* (2013.01); *F05D 2300/6033* (2013.01)

(58) Field of Classification Search
CPC . F01D 5/147; F01D 5/28; F01D 5/282; F01D 5/284; F05D 2230/51; F05D 2230/60; F05D 2300/601; F05D 2300/6033; B29C 70/086; B29C 70/18; B29C 65/62
See application file for complete search history.

(56) References Cited

U.S. PATENT DOCUMENTS

| 5,308,228 A | * | 5/1994 | Benoit | .................... F01D 5/282 |
| | | | | 416/230 |
| 5,392,514 A | * | 2/1995 | Cook | ...................... B29C 70/86 |
| | | | | 29/889.71 |
| 8,357,323 B2 | | 1/2013 | Morrison | |
| 10,618,631 B2 | * | 4/2020 | Amat | ..................... B64C 11/20 |
| 2005/0053466 A1 | | 3/2005 | Finn et al. | |

(Continued)

FOREIGN PATENT DOCUMENTS

DE     4102909 A1    6/1992
EP     0526057 A1    2/1993

(Continued)

OTHER PUBLICATIONS

Mozart AG, www.mozart-blades.com, "The Art of Cutting Prepreg", Aug. 20, 2016.

(Continued)

*Primary Examiner* — Eldon T Brockman
*Assistant Examiner* — Danielle M. Christensen
(74) *Attorney, Agent, or Firm* — Barlow, Josephs & Holmes, Ltd.; David R. Josephs

(57) ABSTRACT

The present invention relates to a blade for a gas turbine, in particular of an aircraft engine, which is produced at least in part from ceramic matrix composite with a plurality of superimposed fabric layers, wherein at least one pair of superimposed fabric layers comprises a first fabric layer that has at least one first point of interruption between two mutually facing first edges of this fabric layer, and a second fabric layer that has at least one second point of interruption adjacent to the first point of interruption between two mutually facing second edges of the second fabric layer, this second point being displaced from the first point of interruption.

7 Claims, 2 Drawing Sheets

(56) References Cited

U.S. PATENT DOCUMENTS

2005/0238491 A1* 10/2005 Morrison ................ F01D 5/282
                                                                                416/229 R
2010/0021290 A1    1/2010 Schaff et al.
2016/0305271 A1* 10/2016 Schmidt ................ B32B 15/18

FOREIGN PATENT DOCUMENTS

| EP | 3339574 A1 | 6/2018 |
|----|------------|--------|
| WO | 2015073852 A1 | 5/2015 |

OTHER PUBLICATIONS

Mikrosam, www.mikrosam.com, "Prepreg Cutting and Wrapping", accessed 2018.

Camtec GmbH, www.camtec.de, "tool plotter, plotter, cutter, PREPREG, plotter for ultrasonic, water jet, laser, cutting, milling", Oct. 27, 2016.

EFW, www.elbeflugzeugwerke.com, "Leading Lightweight Technologies", accessed 2018.

* cited by examiner

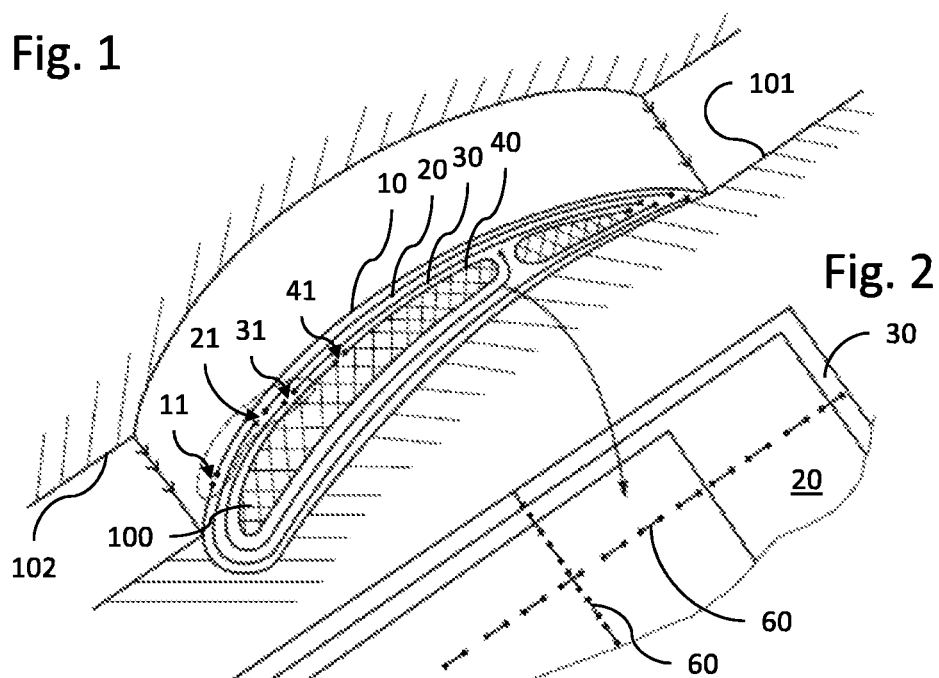
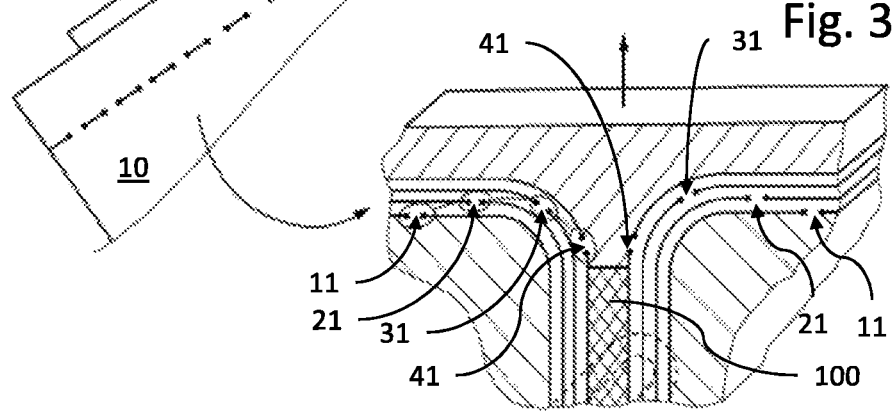

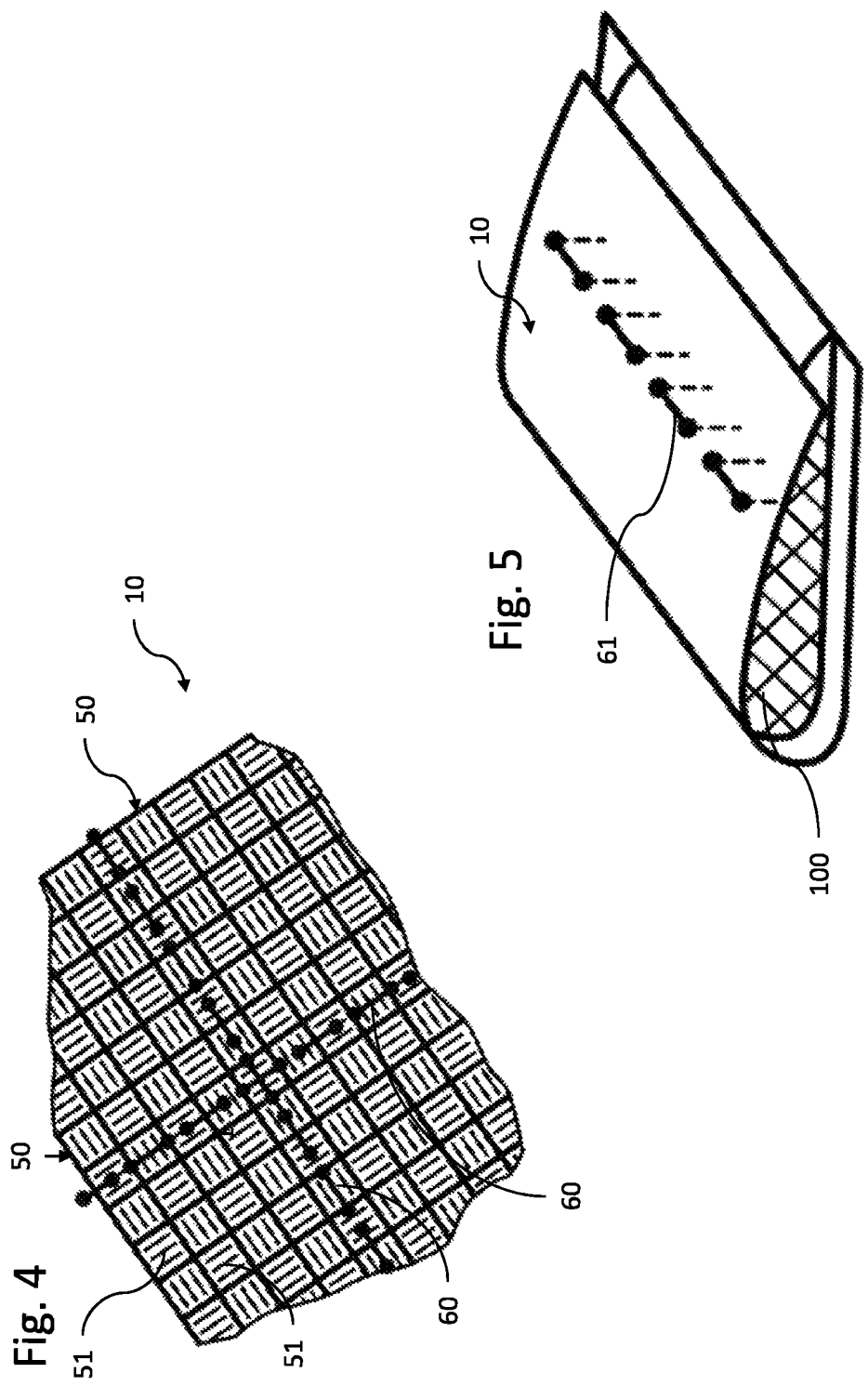

GAS TURBINE BLADE

BACKGROUND OF THE INVENTION

The present invention relates to a blade for a gas turbine, in particular of an aircraft engine, and to a turbine stage or a compressor stage for a gas turbine having the blade as well as to a method for producing the blade.

SUMMARY OF THE INVENTION

An object of one embodiment of the present invention is to improve a gas turbine blade.

This object is achieved by a blade and by a method of the present invention. The present invention sets forth a turbine stage or a compressor stage for a gas turbine that has at least one blade described here. Advantageous embodiments of the invention are discussed in detail below.

In accordance with one embodiment of the present invention, an (at least) one blade for a turbine stage and/or a compressor stage, in particular of (at least) one turbine stage and/or one compressor stage, for a gas turbine, in particular of one gas turbine, in particular of an aircraft engine, particularly its blade element, blade root, and/or blade platform on a side of the blade root and/or a side of the blade element tip, is or will be produced in full or in part from ceramic matrix composite and with a plurality of superimposed fabric layers.

In one embodiment, the ceramic matrix composite (CMC) comprises a matrix, which, in one embodiment, comprises a ceramic, in particular aluminum oxide, silicon carbide, or the like, in which a fiber fabric containing fibers or fiber bundles, which, in one embodiment, comprise a ceramic, in particular aluminum oxide, silicon carbide, or the like, is or will be embedded. In one embodiment, fiber bundles of the fiber fabric, so-called strands or rovings, have a plurality of filaments or (single) fibers, which, in particular, are arranged parallel to one another, and/or a diameter, in particular a maximum, minimum, or mean diameter, of at least 1 mm and/or at most 10 mm, particularly at most 5 mm.

Owing to the operating conditions, the present invention is suitable, in particular, for guide vanes and rotating blades of turbine stages, which accordingly represent an especially advantageous application. Through the use of a ceramic matrix composite, it is possible in one embodiment to provide advantageously light(er) and/or mechanically and/or thermally strong(er) blades or vanes.

In accordance with one embodiment of the present invention, one pair of superimposed fabric layers has or a plurality of pairs of superimposed fabric layers (each) have a first fabric layer, which has at least one first point of interruption between two mutually facing first edges of this fabric layer, and a second fabric layer, which has at least one second point of interruption, which is adjacent to or nearest-lying to the first point of interruption, between two mutually facing second edges of the second fabric layer.

In one embodiment, the first edges abut each other at or in the first point of interruption, so that the first point of interruption forms a contact or a point of contact in the first fabric layer. Additionally or alternatively, in one embodiment, the second edges abut each other at or in the second point of interruption, so that the second point of interruption forms a contact or a point of contact in the second fabric layer. In this way, it is advantageously possible in one embodiment to produce an especially stable ceramic matrix composite.

Similarly, the first edges at the first point of interruption and/or the second edges at the second point of interruption can be spaced apart from each other or overlap each other. In one embodiment, the (first or second) point of interruption is the centerline between the two (first or second) edges.

In accordance with one embodiment of the present invention, the second point of interruption is displaced from or relative to or against the first point of interruption; in one embodiment, this displacement is in the surface direction of the fabric layers or perpendicular to their wall thickness, and/or at least 1.5 times, preferably at least twice, a diameter, in particular a maximum, minimum, or mean diameter, of a fiber bundle of the first fabric layer that is adjacent to or nearest-lying to the first point of interruption.

In one embodiment, a plurality of fabric layers, in particular superimposed fabric layers, each form such a pair in pairs. In other words, in one embodiment, the mutually adjacent or nearest-lying points of interruption of a plurality of superimposed fabric layers, in particular at least three superimposed fabric layers, in one embodiment at least four superimposed fabric layers, and preferably at least five superimposed fabric layers, are displaced relative to each other in pairs, in one embodiment in the same direction, while in another embodiment, in the surface direction of the fabric layers or perpendicular to the wall thickness thereof, and/or (each time) by at least 1.5 times, preferably (each) by at least twice a diameter, in particular a maximum, minimum, or mean diameter, of a fiber bundle of the respective first fabric layer that is adjacent to or nearest-lying to the respective first point of interruption.

In this way, in one embodiment, an especially stable ceramic matrix composite can be produced advantageously.

In one embodiment, the first fabric layer of the pair or of one pair or a plurality of pairs has (in each case) at least one first cut piece of fabric, which has or forms at least one of the two first edges, and the second fabric layer of this pair has (in each case) at least one second cut piece of fabric, which has or forms at least one of the two second edges, wherein the first cut piece of fabric and/or the second cut piece of fabric (each) has an area of at least 100 $mm^2$, in particular at least 200 $mm^2$, and/or at most $1 \cdot 10^4$ $mm^2$, in particular at most 2500 $mm^2$.

(Only) through the utilization of such small-area cut pieces of fabric is it possible, in particular, to produce blades with small(er) dimensions and/or complex geometries advantageously, particularly in a reliable process and/or in a structurally stable manner.

However, such small-area cut pieces of fabric are difficult to handle during the production of the ceramic matrix composite. Thus, for instance, a cut piece of fabric of 15 mm×15 mm for a fiber bundle diameter that lies in the range of 3 mm consists of only 5 adjacently arranged fiber bundles, which cross 5 adjacently arranged fiber bundles, so that the fiber bundles at the edge can easily be lost or the cut piece of fabric can easily fray or fall apart.

Therefore, in a preferred embodiment, the two cut pieces of fabric of the first and second fabric layer of the pair or of one pair or a plurality of pairs will be or are stitched together (in each case). In a preferred embodiment, insofar as a plurality of fabric layers, in particular superimposed fabric layers, each form in pairs such a pair with the (respective) first fabric layer comprising the (respective) first cut piece of fabric and with the (respective) second fabric layer comprising the (respective) second cut piece of fabric, three or more of these cut pieces of fabric or the first and second cut pieces of fabric of two or more of the pairs will be or are all stitched together, in particular jointly.

In this way, in one embodiment, the handling during the production of the blade is improved and, in the case of small cut pieces of fabric, is indeed made possible at all under certain circumstances. Correspondingly, one aspect of the present invention is based on the idea that, through the stitching together as well as the displacement of the points of interruption, it is also possible to use small cut pieces of fabric of less than $1 \cdot 10^4$ mm for, in particular, at least partly automated production of gas turbine blades from a ceramic matrix composite.

In accordance with one embodiment of the present invention, a method for producing, in particular, blanks of a blade described here comprises the following steps of:

providing, in particular, cutting the piece of cut fabric or the first and second cut piece(s) of fabric, in one embodiment, by use of a first automated machine;

arranging the piece of cut fabric or the first and second cut pieces of fabric on each other in such a way that, for a first and a second fabric layer or for first and second fabric layers that have been placed in a die, in particular a reusable mold, the second point or points of interruption is or are or will be displaced from the first point or points of interruption (in each case), in particular by at least 1·5 times a diameter of one of the (respective) fiber bundles of the (respective) first fabric layer that is adjacent to the first point of interruption, in one embodiment, by use of the first or of a second automated machine;

stitching the piece of cut fabric or the first and second cut pieces of fabric together, in one embodiment, by use of the first or second automated machine or of another automated machine;

inserting, in particular manually inserting, the cut pieces of fabric, which have been stitched together, into the die; and producing, in particular pre-forming, the ceramic matrix composite with the cut pieces of fabric that have been stitched together and inserted into the die, in one embodiment, by embedding the cut pieces of fabric, which have been stitched together, into or in a matrix or the matrix.

Through the use of automated machines for cutting and/or arranging ("cutting and/or stacking machine") and/or automated machines for stitching, in particular the same automated machines, the production can be advantageously (partially) automated. If this is combined with a preferred manual insertion into the die, then it is possible advantageously, both during the (pre)fixing of the fabric layers on one another and during insertion into the die, to achieve a higher precision.

In one embodiment, the cut pieces of fabric, which have been stitched together and inserted into the die, surround, at least in part, a core, which, in a further development, is removed after the ceramic matrix composite has been produced, in particular by withdrawing it, destroying it, and/or shrinking it.

In this way, it is possible advantageously to produce hollow blades of low(er) weight.

In one embodiment, the cut pieces of fabric are stitched together with the core, in particular with the use of an automated machine.

In this way, in one embodiment, the handling during production and/or the strength of the blade can be improved.

BRIEF DESCRIPTION OF THE DRAWING FIGURES

Additional advantageous further developments of the present invention ensue from the dependent claims and the following description of preferred embodiments. For this purpose, in a partially schematic manner:

FIG. 1 shows the production of a blade in accordance with one embodiment of the present invention in a section perpendicular to a longitudinal axis of the blade;

FIG. 2 shows a plurality of fabric layers or cut pieces of fabric of the blade in a view from the top;

FIG. 3 shows the production of the blade in a section perpendicular to FIG. 1;

FIG. 4 shows a view from the top of cut pieces of fabric of the blade that have been stitched together; and FIG. 5 shows a core that is surrounded by the cut pieces of fabric and stitched together with them.

DESCRIPTION OF THE INVENTION

FIG. 1 shows the production of a blade in accordance with one embodiment of the present invention in a section perpendicular to a longitudinal axis of the blade.

For this purpose, first of all, fabric for a ceramic matrix composite is cut by an automated machine (not illustrated), the cut pieces of fabric are superimposed on one another by the same automated machine, and subsequently they are stitched together by this automated machine or by another automated machine.

For this purpose, FIG. 4 shows a view from the top of an excerpt of cut pieces of fabric that have been stitched together, in which the fiber bundles 50, which form the fabric or the fabric layers thereof, the filaments or (single) fibers 51, which comprise these fiber bundles 50, and the (fixing) stitches 60 are indicated. In the excerpt of FIG. 4, only a top fabric layer with a cut piece of fabric 10 can be seen; in the view from the tope in FIG. 2, in contrast, three of the superimposed fabric layers of cut pieces of fabric 10, 20, 30, together with the (fixing) stitches 60, with which they are stitched together, can be seen.

The fabric layers or cut pieces of fabric 10, 20, 30 that have been stitched together are wound around a core 100 and stitched together with it by (fixing) stitches 61, as indicated in FIG. 5.

Subsequently, the core 100 and the fabric layers or cut pieces of fabric 10, 20, 30 that have been stitched together with it and surround it are inserted into a reusable mold 101, 102, which is then closed, as indicated in FIG. 1 by closing arrows.

In this state, adjacent points of interruption between the edges 11, 21, 31, 41 of the superimposed fabric layers or cut pieces of fabric 10, 20, 30, and 40 are displaced away from and with respect to one another perpendicular to the wall thickness of the fabric layers, so that a chain of points of interruption that are displaced from or against or toward one another results between the edges 11, 21, 31, 41, this being illustrated in a highlighted manner in FIG. 3.

The fabric layers or cut pieces of fabric are already superimposed on one another by the cutting and stacking machine (and stitched together by this machine or by the other automated machine) in such a way that, in the state shown in FIGS. 1, 3, respective pairs (10, 20), (20, 30), and (30, 40) of superimposed fabric layers each have a first fabric layer 10, 20, and 30, respectively, which has at least one first point of interruption between two mutually facing first edges 11, 21, and 31, respectively, of this fabric layer, and a second fabric layer 20, 30, and 40, respectively, which has at least one second point of interruption adjacent to the first point of interruption between two mutually facing second edges 21, 31, and 41, respectively, of the second fabric layer, which is displaced from the first point of interruption (in each case, in the same direction).

In this state, a ceramic matrix composite with cut pieces of fabric that have been stitched together and inserted into the reusable mold is produced and, in this way, a blade is produced, in particular by a polymer or the like that contains Al, Si, and/or C atoms.

Subsequently, the reusable mold is opened and the blade is removed, this being indicated by the removal direction arrow in FIG. 3. The CMC blade can then be finished by pyrolysis or baking.

Even though exemplary embodiments have been discussed in the preceding description, it is noted that a large number of modifications are possible. Moreover, it is noted that the exemplary embodiments are merely examples, which are not intended to limit the protective scope, the applications, and structure in any way. Instead, the preceding description provides the person skilled in the art with a guideline for implementing at least one of the exemplary embodiments, whereby diverse changes, in particular in regard to the function and arrangement of the described structural parts, can be made, without leaving the protective scope, as ensues from the claims and the combinations of features equivalent to said claims.

What is claimed is:

1. A blade for a gas turbine composed at least in part from ceramic matrix composite with a plurality of superimposed fabric layers, wherein at least one pair of superimposed fabric layers comprises a first fabric layer that has at least one first point of interruption between two mutually facing first edges of this fabric layer, and a second fabric layer that has at least one second point of interruption adjacent to the first point of interruption between two mutually facing second edges of the second fabric layer, this second point being displaced from the first point of interruption, wherein the first fabric layer comprises at least one first cut piece of fabric that has at least one of the two first edges, and the second fabric layer comprises at least one second cut piece of fabric that has at least one of the two second edges, wherein at least one of the two cut pieces of fabric has an area of at least 100 mm$^2$ and at most $1 \cdot 10^4$ mm$^2$.

2. The blade according to claim 1, wherein the two cut pieces of fabric are stitched together.

3. The blade according to claim 1, wherein the second point of interruption is displaced from the first point of interruption by at least 1.5 times a diameter of a fiber bundle of the first fabric layer that is adjacent to the first point of interruption.

4. The blade according to claim 1, wherein at least one blade is configured and arranged in a turbine stage or compressor stage.

5. The blade according to claim 1, wherein
the first and second cut pieces of fabric, being cut by an automated machine;
the first and second cut pieces of fabric on each other in such a way that, for a first and second fabric layer that has been inserted into a die, the second point of interruption is displaced from the first point of interruption by at least 1.5 times a diameter of a fiber bundle of the first fabric layer that is adjacent to the first point of interruption, by use of the first automated machine or a second automated machine;
the first and second cut pieces of fabric being stitched together by the first or second automated machine, or another automated machine;
the cut pieces of fabric that have been stitched together being inserted into the die; and
the ceramic matrix composite with the cut pieces of fabric that have been stitched together and inserted into the die being provided.

6. The blade according to claim 5, wherein the cut pieces of fabric, which have been stitched together and inserted into the die, surround a core, at least in part.

7. The blade according to claim 6, wherein the cut pieces of fabric are stitched together with the core by an automated machine.

* * * * *